(12) United States Patent
Harris

(10) Patent No.: US 6,711,610 B1
(45) Date of Patent: Mar. 23, 2004

(54) SYSTEM AND METHOD FOR ESTABLISHING SECURE INTERNET COMMUNICATION BETWEEN A REMOTE COMPUTER AND A HOST COMPUTER VIA AN INTERMEDIATE INTERNET COMPUTER

(75) Inventor: Clifford V. Harris, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,359

(22) Filed: Sep. 10, 1999

(51) Int. Cl.[7] .......................... G06F 15/16; G06F 11/30
(52) U.S. Cl. ...................... 709/217; 709/218; 709/229; 713/200; 713/201
(58) Field of Search ............................... 709/229, 228, 709/200, 217, 218, 227; 713/201, 200; 345/5.1, 5.8, 825

(56) References Cited

U.S. PATENT DOCUMENTS

| | | |
|---|---|---|
| 5,598,536 A | 1/1997 | Slaughter, III et al. |
| 5,809,118 A | 9/1998 | Carmello et al. |
| 6,308,213 B1 * | 10/2001 | Valencia ..................... 709/229 |

* cited by examiner

Primary Examiner—Wen Tai Lin
(74) Attorney, Agent, or Firm—Floyd A. Gonzalez; Cantor Colburn LLP

(57) ABSTRACT

A system and method is provided for initiating an activation script of commands that create a connection between the host system and the Internet. A user at a remote computer system initiates a request over the Internet to a intermediary computer system associated with a host system for a remote connection thereto. The intermediary computer system is geographically located in the local telephone calling area of the host computer system and has a continuous connection to the Internet. The intermediary computer system initiates an asynchronous call to the host computer system via modem to transmit the request. The host computer system receives this request to connect to the Internet from the intermediary computer system. This request contains the remote requestor's identity for the purposes of feedback. Authentication of the remote requestor is performed and the host computer system acknowledges the request. The host computer system then disconnects from the intermediary computer system connects to the Internet. If the remote requestor is not authenticated then the host computer system disconnects from the intermediary system and does not connect to the Internet. The host computer system communicates over the Internet with the remote computer system to establish the identity feedback. If identity feedback is verified, then the remote computer system can begin normal TCPIP based communications with the host computer system.

24 Claims, 3 Drawing Sheets

SYSTEM AND METHOD FOR ESTABLISHING SECURE INTERNET COMMUNICATION BETWEEN A REMOTE COMPUTER AND A HOST COMPUTER VIA AN INTERMEDIATE INTERNET COMPUTER

BACKGROUND OF THE INVENTION

The present invention is directed toward the field of remotely controlling the actions of a host computer system using a local telephone connection, particularly in initiating a script of commands which cause the host computer system to connect to the Internet for subsequent access by a remotely located user.

Recently, there has been a proliferation of computer systems that are connected to the Internet, the global information network. Most of the services available on the Internet are provided by large organizations, such as Government, University, and large corporations. These institutions have the capital and resources to spend on high-powered server computers with corresponding dedicated links to the Internet. These dedicated links range in bandwidth from 56 KB for an ISDN (Integrated Services Digital Network) line to 1.5 MB for a full T1 line. Such links are typically dedicated connections to an Internet Service Provider ("ISP"), where the ISP then provides a physical connection to the Internet. For small companies and individual users desirous of setting up a server to provide services, such as a World-Wide-Web ("Web") server, or an FTP (File Transfer Protocol) server, the costs of leasing and maintaining a dedicated connection to an ISP is prohibitive. Without a dedicated connection to the Internet, there is no means of providing on-demand access to remote users who want to take advantage of the services provided by the server.

Previous systems for controlling a host computer system over a telephone connection include (1) remote power-up and (2) remote access. The remote power-up systems include a circuit which detects a telephone call and applies power to the host computer. According to these prior art systems a telephone ring detector and power switch are interposed between the power outlet and the remote computer system to be activated. When a telephone call is detected on the phone line connected to the ring detector, the power switch is activated and the host computer's power supply is connected to the power outlet.

Previous remote access systems permit a remotely located computer system to gain access to a host system through an authorization device, and thereafter to control the actions of the host system. According to these types of systems, a user at a remote location from the host computer system gains access over a telephone connection between the two computers. Each computer includes a modem for communication over the phone line. In order to selectively permit access to certain users, but deny access to others, these remote access systems require the use of special hardware on both ends of the telephone connection, wherein the special hardware is an access control device connected between the respective computer and modem on each end of the connection. The hardware devices perform authorization handshaking using special codes, and if the codes match, the hardware devices permit access to the modem resources connected to the two computers. After the hardware devices have performed the authorization handshaking, the user of the local system then accesses the host system and controls its operations directly, as though he were located at the host system.

Another prior art system combines the teachings of the remote access systems and the remote power-up systems by providing a remote power-up device that is triggered by a phone call, and which "boots" a computer system and causes an access control program stored in the "boot drive" to be activated. Like the other remote access systems, this system assumes that the control of the host system is to be carried out by a local computer. The host system is controlled only after the access software permits access to the local user by first answering the telephone call and then establishing a logical connection between the modem of the host system and that of the local computer.

In yet another prior art system, a predetermined program stored at a host computer system is triggered using a telephone ring signal originating from a remote user, wherein the host system includes a ring detection and triggering circuit connected to a phone line for detecting a ring signal on the line. A trigger signal at the host system indicates that a ring signal has been detected. The host system receives the trigger signal and executes an activation script of commands that create a connection between the host system and the Internet. In an alternate configuration of this system, the remote user does not have to make a telephone call to trigger the host system to connect to the Internet, but instead sends data packets over a network, such as a Web Server, as if communicating to a host system that has a dedicated link. These data packets are then detected by the Internet Service Provider's (ISP) server computer at which the host computer has an account set up, and the server computer determines whether the host system is connected to the Internet. If the host system is not connected, the ISP rings a phone line connected to the host system, thereby triggering a connection to the Internet. To the remote user it would appear that the host computer system has a dedicated link.

SUMMARY OF THE INVENTION

The present invention overcomes the problem of having to lease and support a dedicated connection to the Internet, and meets the needs noted above by providing a system and method for remotely initiating a stored script of commands that cause the host system to connect to the Internet. Using the present invention, a host computer system can be accessed by a remote user, for communications over the Internet, without incurring constant connect charges of a dedicated link to an Internet Service Provider at the host computer system or long distance telephone charges for initiating the host computer system. Also, a small company or individual can achieve the benefits of having their own Internet server computer without the expense and complexity of a dedicated link to an Internet Service Provider.

According to the present invention, a system and method is provided for initiating an activation script of commands that create a connection between the host computer system and the Internet. More specifically, a user at a remote computer system initiates a request over the Internet to a intermediary computer system, e.g., an ISP server computer, associated with a host system for a remote connection thereto. The intermediary computer system is geographically located in the local telephone calling area of the host computer system and has a continuous connection to the Internet. The host computer system has an account setup at the intermediary computer system, whereby it knows the host computer system's identification and any optional service parameters. The intermediary computer system initiates an asynchronous call to the host computer system via modem to transmit the request. The host computer system receives this request to connect to the Internet from the intermediary computer system. This request contains the remote requestor's identity for the purposes of feedback. Authentication of the remote requestor is performed and the host computer system acknowledges the request. The host computer system then disconnects from the intermediary computer system and dials an ISP for connection to the Internet. If the remote requester is not authenticated then the host computer system disconnects from the intermediary system and does not connect to the Internet. The host computer system communicates over the Internet with the remote computer system to establish the identity feedback. If identity feedback is verified, then the remote computer system can begin normal TCPIP based communications with the host computer system.

An advantage of the present invention is that it enables a remote user to gain access to a host computer system without having to pay for long distance telephone charges associated with a direct connection, since the remote user can cause the host computer system to connect to the Internet, and the remote user can then access the services of the host computer system over the Internet. No long distance telephone link is required, and since the Internet is a global network, a remote user could be anywhere in the world, and could gain secure access to the host computer system without having to pay for a very expensive long distance telephone call.

BRIEF DESCRIPTION OF THE DRAWINGS

Referring now to the drawings wherein like elements are numbered alike in the several Figures.

DETAILED DESCRIPTION OF THE DRAWINGS

Figure 1:
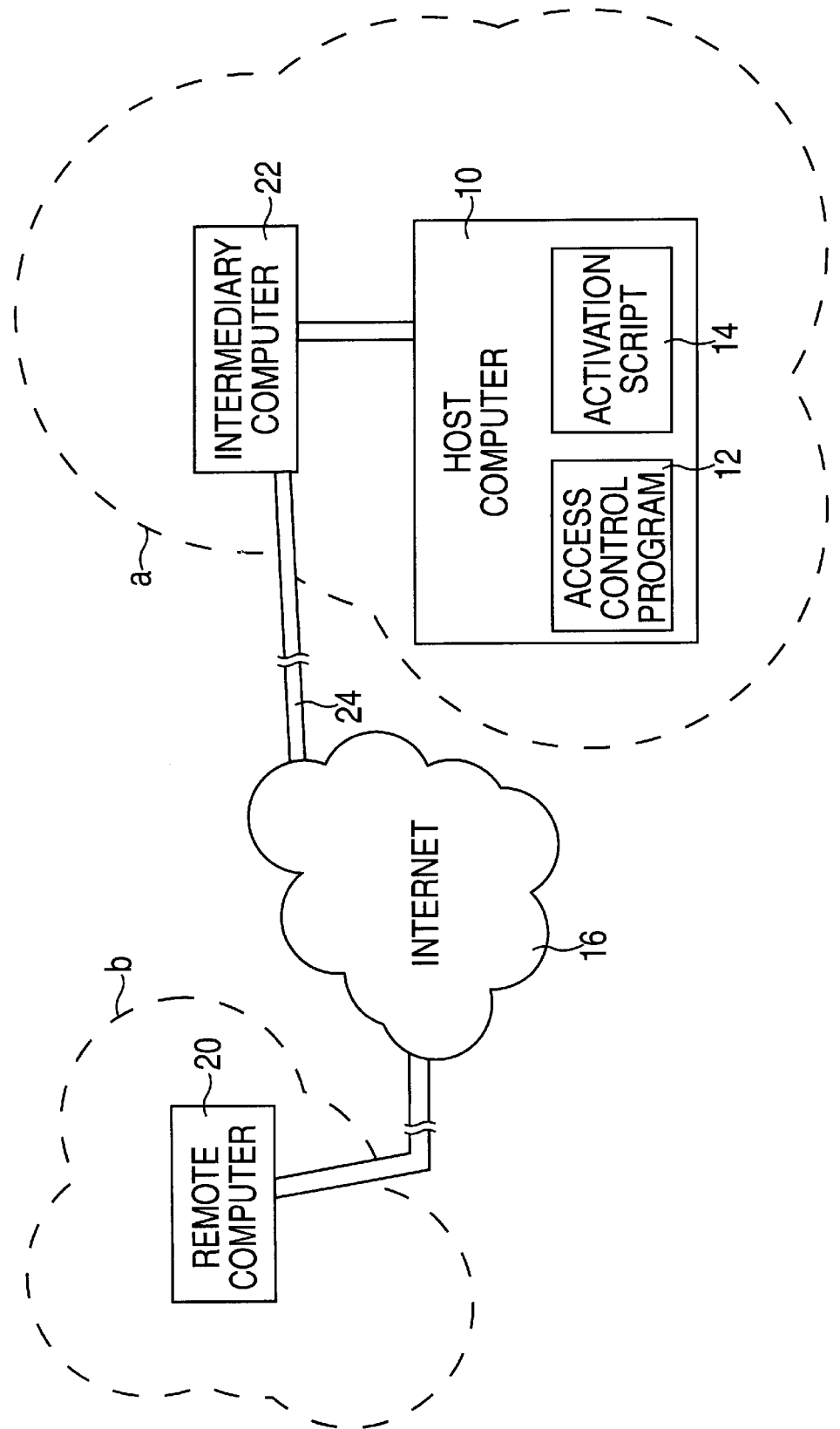
FIG. 1 is a block diagram of a system according to the present invention.

Referring now to FIG. 1, a block diagram of a system according to the present invention is generally shown. A host computer system 10, such as a workstation or mainframe computer system, and which preferably is operating a multi-tasking operating system, such as IBM's OS390, resides at first geographic location designated 'A'. The host computer system includes memory for storing a variety of applications, including an access control program 12 and an activation script 14. The access control program 12 can be a background executing application that monitors an interface port of the host computer system 10 or can be an application that is executed in response to communications received from the interface port. The execution of this access control program 12 results, after certain criteria are met, in the activation script 14 being executed. The activation script 14 when executed initiates a connection between the host computer system 10 and the Internet 16. The activation script 14 can be any sequence of commands which cause the host computer system 10 to make a connection to the Internet 16, such command sequences are well known in the art of data communications. In the preferred embodiment, the activation script 14 creates a connection between the host computer system 10 and the Internet 16, using an internal communications device (not shown) connected to the host computer system 10. The internal communications device could be another analog modem, or could be an ISDN digital communications device, and is connected over a phone line to an ISP, so as to create a connection to the Internet. Connection between the host computer system and the Internet 16 is typically provided through an Internet Service Provider (ISP), which is preferably a server computer with a modem pool, and which provides dial-in and dedicated access to its customers in order to make a connection to the Internet 16. A remote computer system 20, such as a portable personal computer, which has access to the Internet 16 via telephone lines (or otherwise) is located at a second remote geographic location designated 'B'. The remote computer system 20 initiates a request (transmits a data packet) over the Internet 16 to be received at an intermediary computer system 22, e.g., such as the aforementioned ISP server computer, which is associated with the host computer system 10, when the remote computer system 20 desires to communicate with the host computer system 10. The remote computer system 20 would include in its data packets transmitted over the Internet 16 the identity of the remote requestor, information to establish authentication (e.g., a secret software key or code, or data encryption), the request of the remote requestor for the host computer system 10 to connect to the Internet 16 and an IP address for communicating with the remote requestor.

The intermediary computer system 22 is geographically located in the local telephone calling area of the host computer system 10 and has a continuous connection to the Internet, as mentioned above. This request over the Internet 16 is referred to herein as 'in-band'. The host computer system 10 has an account setup at the intermediary computer system 22, whereby it knows the host computer system's identification and any optional service parameters. The intermediary computer system 22 initiates an asynchronous call over telephone lines (or otherwise) to the host computer system 10 via a modem. Once this asynchronous connection between the intermediary computer system 22 and the host computer system 10 is established (direct connections between computer system via a modem and the like being well known), data packets are transmitted to the host computer system 10, such communication being referred to herein as 'out of band'.

The intermediary computer system 22 may perform an authentication check of the identity of the remote requester. In this way the intermediary computer system 22 would only forward request from an approved remote requester, this is easily accomplished by comparing the identity of the remote requestor to an access list. This authentication check may also utilize a secret software key or code, or data encryption, for verifying the authority of the remote user to access the host computer system. The intermediary computer system 22 would include in its data packets transmitted 'out of band' to the host computer system 10 the identity of the intermediary computer system 22 (as more than one could be associated with the host computer system 10), the identity of the remote requestor, the request of the remote requestor for the host computer system 10 to connect to the Internet 16, an IP address for communicating with the remote requester, and information (e.g., a secret software key or code, or data encryption) to establish authentication of the intermediary computer system 22. The remote requestor's identity is subsequently used for the purposes of feedback, which is an important feature of the present invention. The host computer system 10 authenticates and acknowledges the request from the intermediary computer system 22 and then disconnects from the intermediary computer system 22. The access control program 12 performs authentication of the remote requestor's identity with reference to an access list. The request may also include a secret software key or code, or data encryption, for use in authenticating the authority of the remote user to access the host computer system. The activation script 14 is executed causing the host computer system 10 to dial its ISP and perform a login, as is well known. If the remote requestor was not authenticated then the access control program 12 causes the host computer system 10 to disconnect from the intermediary computer system 22 and the host computer system 10 does not proceed with execution of the activation script 14 for connection to the Internet 16. Once logged in, the host computer system 10 connects 'in-band' (over the Internet 16) to the remote computer system 20, via the IP address provided in the request, to establish the aforementioned identity feedback. More specifically, the access control program 12 verifies the identity of the remote requester with reference to an access list and the identity as provided by the intermediary computer system 22 in the earlier 'out of band' communication, based on the identity as now provided by the remote requester. The remote requestor may also be required to provide a secret software key or code, or use data encryption, in verifying its identity to the host computer system. If identity feedback is verified, then the remote computer system can begin normal TCPIP based communications with the host computer system over the Internet 16. The host computer system 10 will disconnect from the Internet 16 after a specified amount of idle time.

Figure 2:
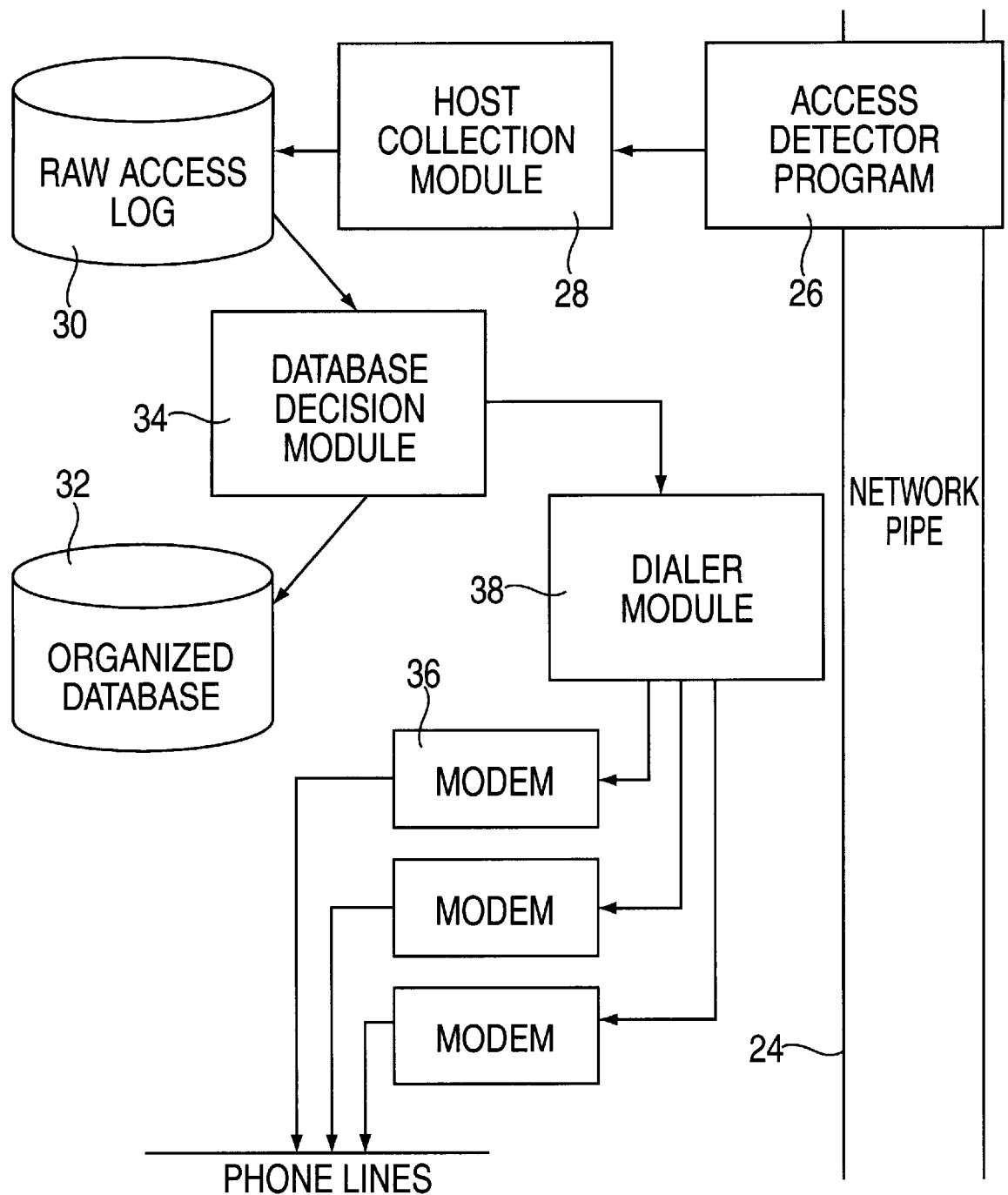
FIG. 2 is a block diagram of an Internet Service Provider (ISP) site that is used as the intermediary computer system.

Referring now to FIG. 2, in a preferred embodiment of the invention the intermediary computer system 22 comprises an ISP server which includes a network connection, or pipe 24, to the Internet 16 over which a multitude of data packets are being transmitted. Each data packet contains routing information, such as an IP address of the intermediary system 22 or some other unique destination information that server computers connected across the network use to direct and route the packet. The data packets transmitted from the remote computer system 20 over the Internet 16 would also include the identity of the remote requestor, the request of the remote requestor for the host computer system 10 to connect to the Internet 16 and an IP address for communicating with the remote requester.

The ISP server system includes a number of software and database components, a server computer, and a pool of modems. The ISP server computer is connected to the Internet via the network pipe 24, which could be a dedicated connection, such as a T1 or T3 high bandwidth telephone connection.

The ISP server includes an access detector program 26, which is a software module that constantly monitors the destination information of data packets transmitted over the network pipe 24, and extracts the destination address information which corresponds to those serviced by that ISP. The information extracted by the access detector program 26 is routed to a collection module 28 which is a software module that collects and stores the destination information of detected packets. This information is then routed to a raw access log 30 where it is stored and time stamped so that the ISP server system knows when access to a customer's host computer system 10 has been requested.

In addition to the raw access log 30, the ISP server includes an organized database 32, which stores a variety of information such as which ISP customers have paid for the remote accessing service and an access list of authorized remote users, how many access requests for a particular customer have been logged into the raw access log, how many request for remote connection have been forwarded to the customer 'out of band', billing information, etc.

The information stored in the raw access log 30 and the organized database 32 is used by a database decision module 34 to determine whether to forward 'out of band' a request received 'in band' from a remote requester requesting the host computer system 10 to connect to the Internet. The database decision module 34 examines the request including performing an authentication check (as described above) of the remote requester based on the access list stored in the organized database 32. If access is authorized the database decision module extracts a phone number of the host computer system 10 for an 'out of band' communication. The ISP server computer then dials the phone number associated with the customer's host computer system 10, using one of the modem's in the server modem pool 36 and a dialer module 38, thus connecting with the host computer system 'out of band' for communicating the request, as described hereinbefore.

Figure 3:
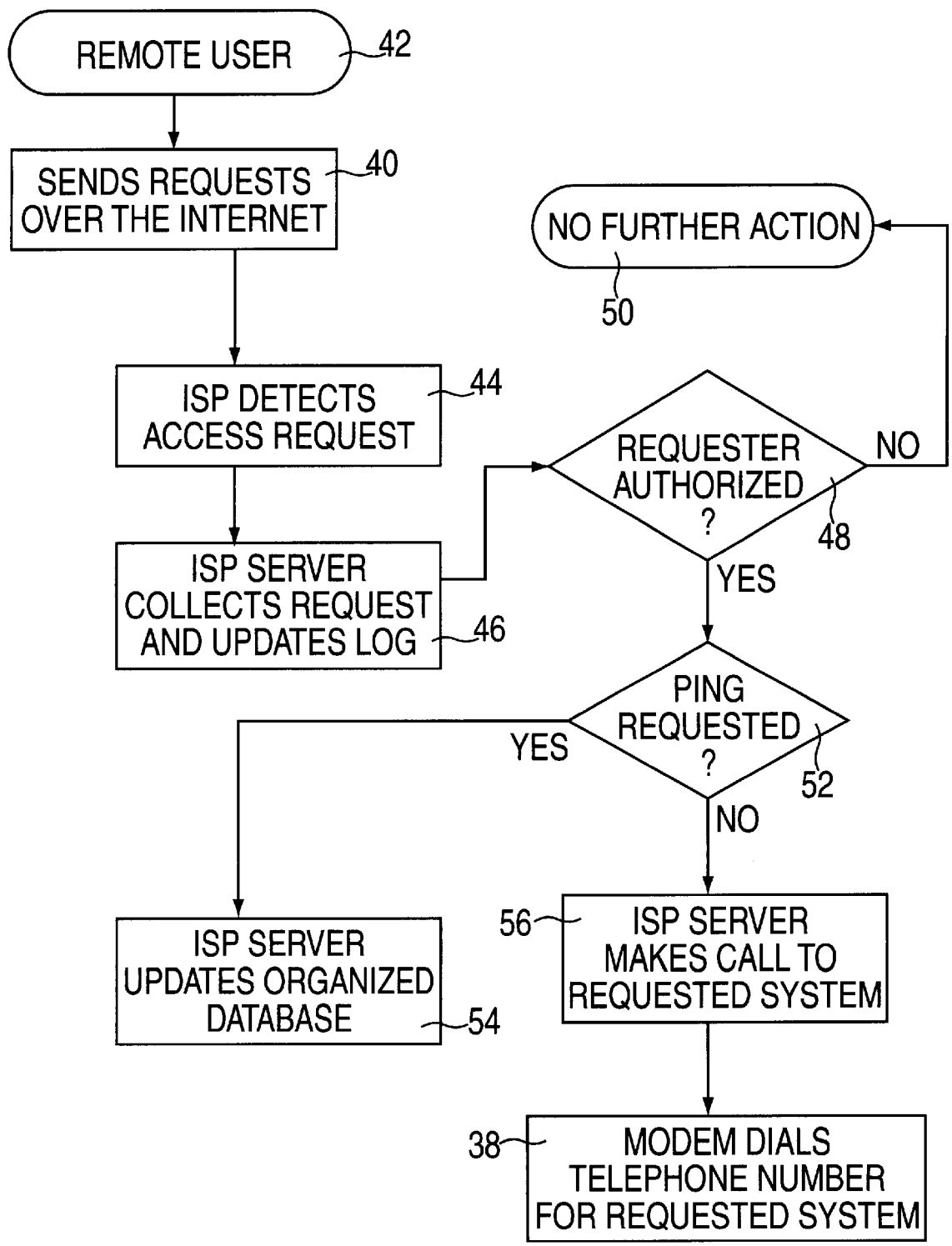
FIG. 3 is a flow chart of the steps carried out by the ISP of FIG. 2.

Referring now to FIG. 3, a flow chart of the steps carried out at the ISP intermediary computer system is provided. In step 40, a remote user 42 transmits data packets with the request information embedded in the packets over the Internet 16. These packets are routed by various other computer systems (not shown) and ultimately are directed to the ISP server. At step 44, the ISP server detects the destination information corresponding to a request to access the host computer system. The ISP server collects this information and routes it to the raw access log in step 46. Following the update to the raw access log, the database decision module then determines, in step 48, whether the requester is authorized (authenticated). If the remote requester is not authenticated, then in step 50 the ISP server takes no additional action. If the remote requester is authenticated, then the ISP server, then in step 52 a "ping" function is executed. The "ping" function is used to determine whether a particular system is presently connected to the Internet. This function is well known in the art of digital communications, particularly communications between computers via a network such as the Internet. If the "ping" command yields a positive result, then the requested host system is presently connected to the Internet, and the ISP server first updates the organized database 32 to reflect the request for services 54 and the request data is transmitted (routed) 'in-band' to the host computer system. If the "ping" command indicates that the requested host system is not presently connected to the Internet, then the ISP server makes a telephone call 56 to the host computer system 'out of band' using a modem 58. After the ISP server dials the phone number of the host computer system, the request data is transmitted (routed) 'out of band' to the host computer system. If the host computer system is not available, then the ISP server will redial until the host computer system makes a connection, or until some maximum number of redials is attempted. This request (the data pockets transmitted 'in band' or 'out of band') will cause the host system computer to execute the script that will create a connection to the Internet.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of initiating communication between a host computer system and a remote computer system comprising:
   transmitting from the remote computer system request data over an Internet;
   receiving at an intermediary computer system said request data from the Internet;
   transmitting from the intermediary computer system said request data outside of the Internet;
   receiving at the host computer system said request data from outside of the Internet;
   first authenticating an identity of the remote computer system at the host computer system;
   connecting the host computer system to the Internet in response to said request data when said identity of the remote computer system is first authenticated;
   communicating over the Internet between the host computer system and the remote computer system;
   second authenticating said identity of the remote computer system at the host computer system in response to data received in said communicating over the Internet, and continuing said communicating over the Internet when said identity of the remote computer system is second verified;
   third authenticating said identity of the remote computer system at the intermediary computer system; and
   wherein said transmitting from the intermediary computer system said request data outside of the Internet comprises transmitting from the intermediary computer system said request data outside of the Internet when said identity of the remote computer system is third authenticated.

2. The method of claim 1 wherein said intermediary computer system comprises an Internet service provider server system.

3. The method of claim 1 wherein said transmitting from the intermediary computer system said request data outside of the Internet includes initiating an asynchronous call over telephone lines using a modem at the intermediary computer system.

4. The method of claim 1 wherein said first authenticating comprises comparing said identity to an access list stored at the host computer system.

5. The method of claim 1 wherein at least one of said first authenticating and said second authenticating steps utilizes a secret software key or data encryption.

6. The method of claim 1 wherein said connecting the host computer system to the Internet in response to said request data comprises executing an activation script stored at the host computer system.

7. The method of claim 1 wherein said request data includes an IP address for use by the host system for communicating with the remote computer system.

8. A system comprising:
   a remote computer system for transmitting request data over an Internet;
   an intermediary computer system receptive to said request data from the Internet and configured for transmitting said request data outside of the Internet in response to said request data;
   a host computer system receptive to said request data from outside of the Internet, said host computer system configured for first authenticating an identity of said remote computer system and connecting said host computer system to the Internet in response to said request data when said identity of the remote computer system is first authenticated, said host computer system configured for communicating over the Internet between the host computer system and the remote computer system, said host computer system configured for second authenticating said identity of said remote computer system in response to data received in communications over the Internet and continuing communications with said remote computer system over the Internet when said identity of said remote computer system is second verified;
   wherein said intermediary computer system is further configured for third authenticating said identity of said remote computer system, and wherein said intermediary computer system configured for transmitting said request data outside of the Internet comprises transmitting said request data outside of the Internet when said identity of the remote computer system is third authenticated.

9. The system of claim 8 wherein said intermediary computer system comprises an Internet service provider server system.

10. The system of claim 8 wherein said intermediary computer system includes a modem for transmitting said request data outside of the Internet includes by initiating an asynchronous call over telephone lines using said modem.

11. The system of claim 8 wherein said host computer system configured for first authenticating said identity of said remote computer system comprises comparing said identity to an access list stored at the host computer system.

12. The system of claim 8 wherein at least one of said first authenticating and said second authenticating utilizes a secret software key or data encryption.

13. The system of claim 8 wherein said host computer system configured for connecting said host computer system to the Internet in response to said request data comprises executing an activation script stored at said host computer system.

14. The system of claim 8 wherein said request data includes an IP address for use by the host system for communicating with the remote computer system.

15. A method of initiating communication between a host computer system and a remote computer system, comprising:
   transmitting from the remote computer system request data over an Internet;

receiving at an intermediary computer system said request data from the Internet;

transmitting from the intermediary computer system a signal to determine if the host computer system is connected to the Internet;

transmitting from the intermediary computer system said request data (1) over the Internet when the host computer system is connected to the Internet and (2) outside of the Internet otherwise;

receiving at the host computer system said request data;

first authenticating an identity of the remote computer system at the host computer system;

communicating over the Internet between the host computer system and the remote computer system when said identity of the remote computer system is first authenticated;

second authenticating said identity of the remote computer system at the host computer system in response to data received in said communicating over the Internet, and continuing said communicating over the Internet when said identity of the remote computer system is second verified;

third authenticating said identity of the remote computer system at the intermediary computer system;

wherein said transmitting from the intermediary computer system said request data outside of the Internet comprises transmitting from the intermediary computer system said request data outside of the Internet when said identity of the remote computer system is third authenticated.

16. The method of claim 15 wherein said intermediary computer system comprises an Internet service provider server system.

17. The method of claim 15 wherein said first authenticating comprises comparing said identity to an access list stored at the host computer system.

18. The method of claim 15 wherein at least one of said first authenticating and said second authenticating steps utilizes a secret software key or data encryption.

19. The method of claim 15 wherein said request data includes an IP address for use by the host system for communicating with the remote computer system.

20. A system comprising:

a remote computer system for transmitting request data over an Internet;

an intermediary computer system receptive to said request data from the Internet, said intermediary computer system configured for transmitting a signal to determine if a host computer system is connected to the Internet and for transmitting said request data (1) over the Internet when said host computer system is connected to the Internet and (2) outside of the Internet otherwise;

a host computer system receptive to said request data, said host computer system configured for first authenticating an identity of said remote computer system, said host computer system further configured for communicating over the Internet between said host computer system and said remote computer system when said identity of said remote computer system is first authenticated, said host computer system configured for second authenticating said identity of said remote computer system in response to data received in communications over the Internet and continuing communications with said remote computer system over the Internet when said identity of said remote computer system is second verified;

wherein said intermediary computer system is further configured for third authenticating said identity of said remote computer system and wherein said intermediary computer system configured for transmitting said request data outside of the Internet comprises transmitting said request data outside of the Internet when said identity of the remote computer system is third authenticated.

21. The system of claim 20 wherein said intermediary computer system comprises an Internet service provider server system.

22. The system of claim 20 wherein said host computer system configured for first authenticating said identity of said remote computer system comprises comparing said identity to an access list stored at the host computer system.

23. The system of claim 20 wherein at least one of said first authenticating and said second authenticating utilizes a secret software key or data encryption.

24. The system of claim 20 wherein said request data includes an IP address for use by the host system for communicating with the remote computer system.

* * * * *